E. F. W. ALEXANDERSON.
ALTERNATING CURRENT MOTOR.
APPLICATION FILED FEB. 4, 1910.
1,068,404.
Patented July 29, 1913.
2 SHEETS—SHEET 1.
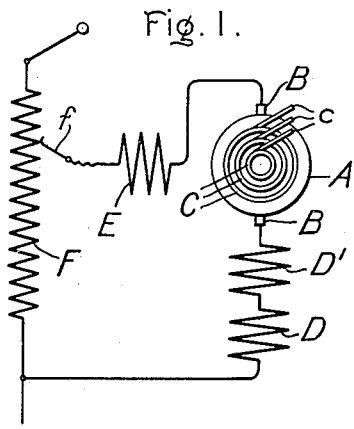
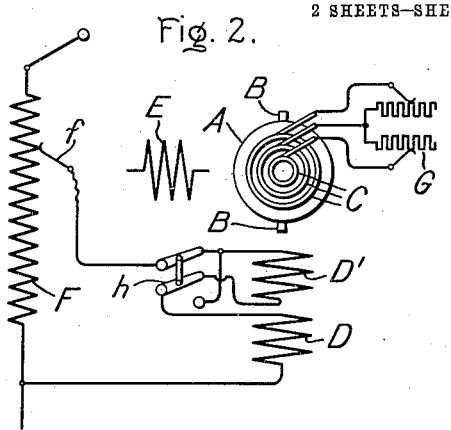
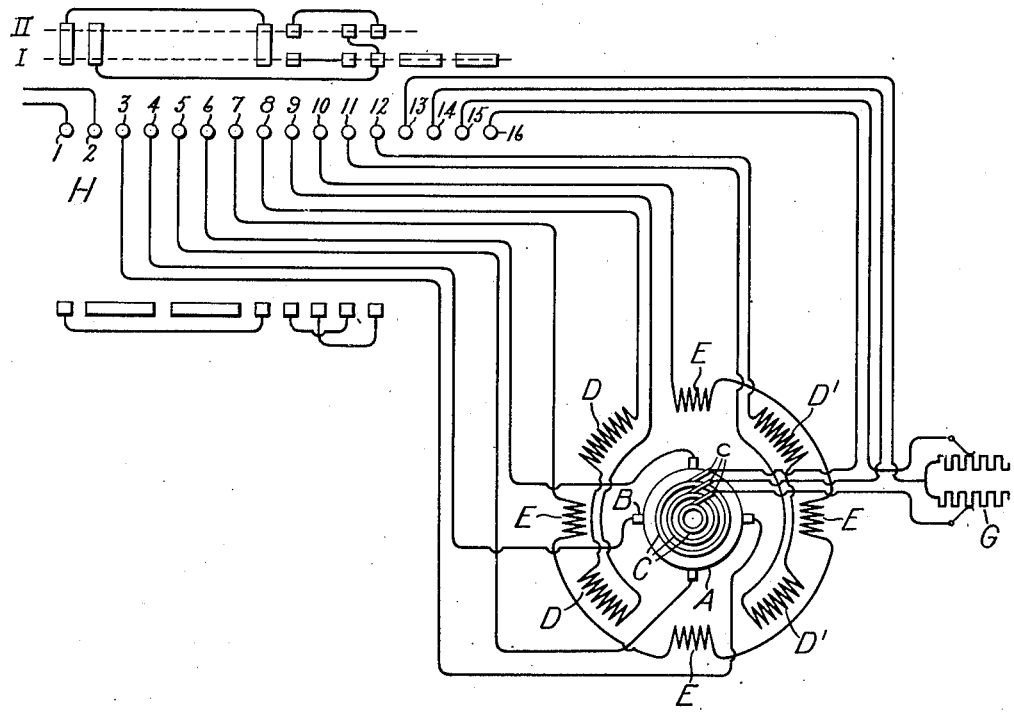
Witnesses:
George W. Tilden
J. Ellis Glen
Inventor:
Ernst F. W. Alexanderson,
by Albert G. Davis
His Attorney.

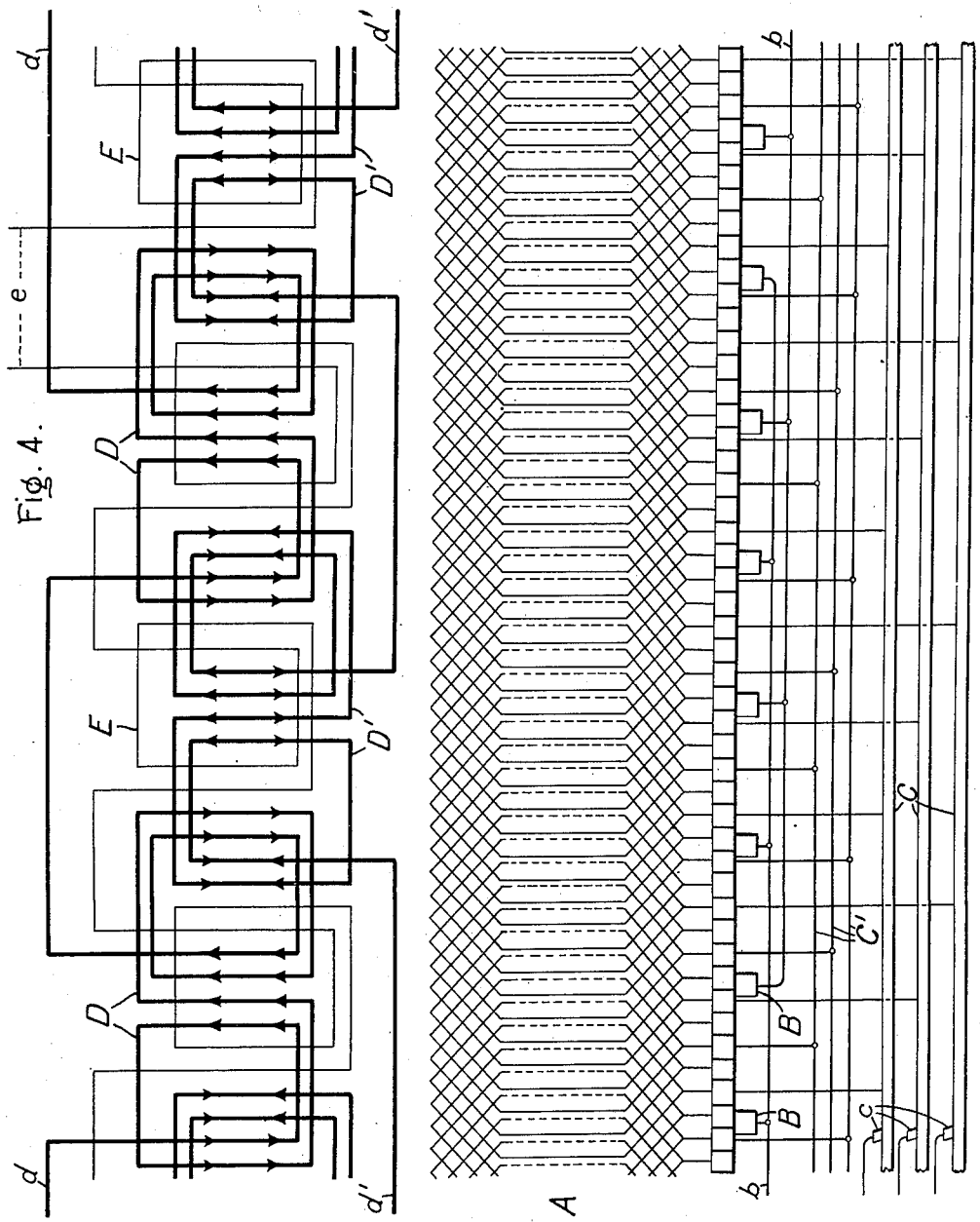

UNITED STATES PATENT OFFICE.

ERNST F. W. ALEXANDERSON, OF SCHENECTADY, NEW YORK, ASSIGNOR TO GENERAL ELECTRIC COMPANY, A CORPORATION OF NEW YORK.

ALTERNATING-CURRENT MOTOR.

1,068,404.

Specification of Letters Patent.

Patented July 29, 1913.

Application filed February 4, 1910. Serial No. 542,058.

*To all whom it may concern:*

Be it known that I, ERNST F. W. ALEXANDERSON, a citizen of the United States, residing at Schenectady, county of Schenectady, State of New York, have invented certain new and useful Improvements in Alternating-Current Motors, of which the following is a specification.

My invention relates to alternating current motors, and its object is to provide simple and effective means for operating such motors as braking generators.

It has been proposed heretofore to provide a single phase commutator motor with collector rings through which the rotor may be short-circuited so as to cause the motor to act as an induction motor, or rather as an induction generator, for electric braking. With prior arrangements this electric braking could be obtained only at one speed, that is, at or rather slightly above, synchronous speed.

It is often desirable to have more than one braking speed, and by my invention I secure this result.

My invention consists in the combination with a motor of the commutator type, of special means for operating the motor as a commutator motor for running and as an induction generator with the rotor circuit closed for braking, and means for varying the number of the poles of the inducing winding to control the braking speed. If the ratio of the pole numbers is two to one, no auxiliary rotor winding nor additional collector rings are required but the rotor may be short-circuited through the collector rings in the usual manner for operating with the larger number of poles, and when operating with the smaller number of poles will be short-circuited directly by the collector rings and equalizing connections of the winding, since the collector rings and equalizing connections will no longer be connected to equi-potential points but to points differing by the maximum induced voltage of the rotor winding.

My invention further comprises a novel arrangement of the stator winding, whereby the pole number may be varied with simple end connections of the coils.

My invention will best be understood by reference to the accompanying drawings, in which,—

Figures 1 and 2 show diagrammatically the connections of an alternating current motor when operating as a motor and as a braking generator, respectively, in accordance with my invention; Fig. 3 shows diagrammatically a motor provided with switch contacts adapted to change the circuit connections for motor operation and for braking operation at two different speeds, and Fig. 4 shows a view of the motor windings developed on a plane surface.

In Fig. 1, A represents the armature of an alternating current motor provided with a commutator and commutator brushes B B and with collector rings C on which there are collector brushes $c$.

D and D' represent the inducing or compensating winding, that is, the winding which produces a magneto-motive force in line with the commutator brushes and which is ordinarily termed an inducing winding if the motor is connected as a repulsion motor and as a compensating winding if the motor is connected as a series motor. It is the latter connection that I have illustrated in Fig. 1.

E represents the exciting winding of the motor connected in series with the armature and the compensating winding.

F represents a transformer winding acting as a source of current for the motor. The point of connection of the motor to the transformer and, consequently the voltage impressed on the motor may be varied by means of the contact $f$.

The compensating or inducing winding is in two sections in order that the number of poles may be altered by reversing the connections of one of these sections for electric braking. The braking connections are shown in Fig. 2. The brushes B B are open-circuited and may be lifted from the commutator if desired. The collector rings C are connected to resistances G, through which the rotor winding is short-circuited. Thus, the motor has the connections of an induction motor and acts as an induction generator for braking. By means of a switch $h$ for reversing one-half of the winding D and D', the number of poles of the motor and, consequently, the braking speed may be varied. The exciting winding E may be left open-circuited for braking operation.

In Figs. 1 and 2 no attempt has been made to indicate the number of poles of the motor.

In Fig. 3 I have shown a motor which operates with four poles for motor operation and for braking at one speed, and with two poles for braking at another speed. A switch H is shown diagrammatically with its contacts developed on a plane surface. These contacts are arranged to establish the connections for operation as a motor and for braking. The switch has sixteen contact fingers, of which the left hand two are connected to the source of current. For motor operation the switch is moved to bring the lowest row of contacts into engagement with the contact fingers. A circuit is then closed from contact finger 1, through contact finger 8, coils D D of the compensating winding, contact fingers 9 and 11, coils D' D' of the compensating winding, contact fingers 12 and 10, coils E E of the exciting winding, contacts 7, 6 and 5 into one set of brushes and through contacts 4, 3 and 2 to the other line connection. The three motor windings are thus connected in series as shown in Fig. 1, except that in Fig. 3 the exciting winding is connected between the other two windings, while in Fig. 1 the armature winding is connected between the other two windings. This difference is wholly immaterial. For electric braking at a speed corresponding to four poles, the switch H is moved to bring the contacts on the dotted line I into engagement with the contact fingers. In this position of the switch a circuit is closed through fingers 1 and 8, coils D D, fingers 9 and 11 and coils D' D' to finger 12 as before, but this finger is connected to contact finger 2, that is, to the other line connection. The compensating winding is thus connected to the source with the same relative connections of its coils as in motor operation, while the exciting winding is cut out of circuit. The collector rings C are connected to the resistance G through contact fingers 13 to 16 inclusive, so that the rotor winding is short-circuited through this resistance. The circuit of the commutator brushes is open at contact fingers 3 to 6 inclusive. The motor is thus connected as an induction motor, as indicated in Fig. 2. For electric braking at the higher speed corresponding to two poles, the switch H is moved to the position indicated by the dotted line II. In this position the connections of the coils D' D' are reversed. This change reduces the number of poles one-half, as may be seen from the following considerations. If the instantaneous polarity produced by the coils D, D, D', D', starting with the upper coil D and moving in a counter clockwise direction, is N, S, N, S, before coils D' D' are reversed, after the reversal the polarity would be N, S, S, N which is a two pole arrangement. The circuit of the collector brushes c is opened in this position of switch H, since the collector brushes are no longer needed, for the rotor winding is short-circuited directly by the collector rings. This is due to the change in the number of poles, as may be seen from the following considerations: If the collector rings are connected to the rotor winding in the usual manner for four pole operation, each ring is connected to equi-potential points on the rotor winding 360 electrical degrees apart, that is, for a four pole machine, 180 physical degrees apart. When the number of poles is changed to two these points are 180 degrees apart both physically and electrically. In other words, instead of being equi-potential points they are now points of maximum potential difference. Consequently, the collector rings act as direct short-circuits for the winding.

In Fig. 4 I have shown diagrammatically developed on a plane surface a suitable arrangement of windings for a motor which is operated with eight poles for motor operation and with eight poles and four poles for braking. The stator coils are wound with a pole pitch corresponding to the greater number of poles, that is, eight. The exciting winding E is shown in light lines with its terminals at e. The four coils or coil groups composing its winding are all similarly connected so as to produce poles of the same polarity and, therefore, poles of the opposite polarity exist between adjacent coils or coil groups of this winding. The compensating winding, shown in heavy lines, is in two portions, one portion D having its terminals at d d and the other portion D' having its terminals at d' d'. It will be noticed that each of these two circuits is composed of two pairs of coils or coil groups, the coils or coil groups of each pair lying side by side; that the pairs of one circuit D alternate with those of the circuit D'; and that the outside conductors of each pair of coil groups lie beside those of the adjacent pairs of the other circuit. That is, at the left hand end of this figure there is a pair of coil groups belonging to the circuit or winding D, each group containing two coils. The right hand conductors of the right hand coil group of this pair lie adjacent to and overlap the left hand conductors of the left hand coil group of the pair of coil groups belonging to the winding D', which pair lies to the right of the pair of coil groups just mentioned as belonging to winding D. The coils composing the winding D' are, for the sake of simplicity, shown on a level slightly below that of the coils belonging to the winding D. If the right hand terminal d is connected to the right hand terminal d' and if current be supposed to be entering left hand terminal d at any instant and leaving the left hand terminal d', the relative directions of current flow in the coils D and D' will be as indicated by the upper row of arrow heads. This is the connection employed for motor operation and for braking at the eight pole speed. It will be seen that the directions of current are such as to produce an eight pole magneto-motive force displaced 90 electrical degrees from that produced by the winding E. For braking at a speed corresponding to four poles, right hand terminal $d$ is connected to left hand terminal $d'$. If then the current be assumed at any instant entering at left hand terminal $d$ and leaving at right hand terminal $d'$, the relative directions of current flow will be as indicated by the lower row of arrow heads. From an inspection of these arrow heads it will be seen that the windings D and D' produce a four pole magneto-motive force.

The winding of armature A is a standard eight pole multiple or lap winding, the armature being shown as having six slots per pole. Brushes of like polarity are connected together in the usual manner, the terminals through which the rotor connections are established for motor operation being indicated at $b\ b$. The collector rings C are connected in the usual manner to points which are equi-potential when the motor is operating with its usual connections, that is, with eight poles, each collector ring being connected to four points on the rotor winding and the distance between the points on the rotor winding connected to adjacent collector rings being equal to four commutator segments, that is, to 120 electrical degrees. In addition to the collector rings, equalizing connections C' are employed, as is customary in this type of winding. The connections from the rotor winding to these equalizing connections are similar to those to the collector rings. In fact, the collector rings serve as equalizing connections for motor operation. When the motor is connected with four poles for electric braking, the points on the rotor winding which were equi-potential for eight poles, become points of maximum potential difference, as heretofore explained, and then each collector ring and each equalizing connection is acting as a direct short-circuit on the rotor winding.

I do not desire to limit myself to the particular construction and arrangement of parts shown and described, but aim in the appended claims to cover all modifications which are within the scope of my invention.

What I claim as new and desire to secure by Letters Patent of the United States is:

1. In combination, an alternating current motor having inducing and exciting windings on the stator and a rotor winding provided with a commutator and collector rings, means for connecting the motor to the source for motor operation with both stator windings in circuit and the rotor winding connected through the commutator, means for connecting the inducing winding only to the source and short-circuiting the rotor winding through the collector rings for electric braking, and means for varying the connections so as to change the pole number of the inducing winding to control the braking speed.

2. In an alternating current motor, a winding for producing two different pole numbers composed of coils having a pitch corresponding to the larger pole number connected in two circuits each composed of pairs of coil groups, the coil groups of each pair lying side by side, the pairs of one circuit alternating with the pairs of the other circuit, and the outside conductors of each pair of coil groups lying beside those of the adjacent pairs of the other circuit, and means for reversing the connections of one circuit relatively to the other.

3. In combination, an alternating current motor having a stator winding for producing with different connections two different pole numbers, and a rotor winding provided with a commutator and equalizing connections, means for connecting the stator winding for the larger number of poles and closing the circuit of the rotor winding through the commutator for motor operation, and means for operating the motor for braking as an induction generator with the rotor short circuited through said equalizing connections comprising means for varying the connections so as to change the number of poles of the stator winding.

4. In combination, an alternating current motor having a multiple rotor winding provided with a commutator and collector rings, each ring connected to two points on the winding, collector brushes, a source of current for said motor, means for connecting the motor to the source with the rotor circuit closed through the commutator for motor operation, means for short circuiting the rotor through the collector rings and collector brushes for electric braking, and means for changing the connections of the stator winding to reduce the number of poles one-half for braking at a different speed, whereby the collector rings then serve as direct short circuiting connections for the rotor winding.

5. In combination, an alternating current motor having a stator winding for producing with different connections two different pole numbers, and a rotor winding provided with a commutator and equalizing connections, means for connecting the motor to the source with the rotor circuit closed through the commutator for motor operation, and means for operating the motor for braking as an induction generator with the rotor short circuited through said equalizing connections comprising means for varying the connections so as to change the number of poles of the stator winding.

6. In combination, an alternating current motor having a rotor winding provided with a commutator and equalizing connections, a stator winding, means for connecting the motor to the source with the rotor circuit closed through the commutator for motor operation, and means for operating the motor for braking as an induction generator with the rotor short-circuited through said equalizing connections comprising means for changing the connections of the stator winding to reduce the number of poles one-half and connecting said stator winding to the source.

In witness whereof, I have hereunto set my hand this 3rd day of February, 1910.

ERNST F. W. ALEXANDERSON.

Witnesses:
   BENJAMIN B. HULL,
   HELEN ORFORD.